Figure 1:
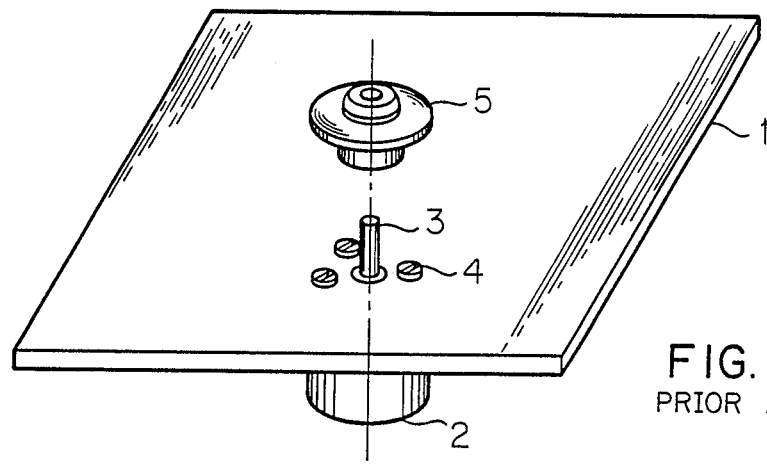

United States Patent [19]

Laufer

[11] Patent Number: 4,800,553
[45] Date of Patent: Jan. 24, 1989

[54] DEVICE FOR RECORDING INFORMATION ON AND PLAYING IT BACK FROM A DRIVEN RECORDING MEDIUM

[75] Inventor: Helmut Laufer, St. Georgen, Fed. Rep. of Germany

[73] Assignee: Deutsche Thomson-Brandt GmbH, Villingen-Schwenningen, Fed. Rep. of Germany

[21] Appl. No.: 138,377

[22] PCT Filed: Feb. 25, 1986

[86] PCT No.: PCT/EP86/00092
§ 371 Date: Oct. 5, 1987
§ 102(e) Date: Oct. 5, 1987

[87] PCT Pub. No.: WO87/05144
PCT Pub. Date: Aug. 27, 1987

[30] Foreign Application Priority Data

Feb. 25, 1986 [DE] Fed. Rep. of Germany ........... 3502708

[51] Int. Cl.⁴ ................ G11B 33/02; G11B 19/20; H02K 5/00
[52] U.S. Cl. .................................................. 369/263
[58] Field of Search .............. 369/263, 266, 270, 271; 360/98, 99, 106

[56] References Cited

U.S. PATENT DOCUMENTS 2,948,539 8/1960 Kenney ........................ 369/269
3,330,515 7/1967 Janssen et al. ................ 248/26

FOREIGN PATENT DOCUMENTS 2062499 6/1971 France .
2360147 7/1977 France .
2408938 8/1979 France .
633461 12/1949 United Kingdom .

OTHER PUBLICATIONS

Research Disclosure #181, Havants, *Motor Mount*, 5/79.

Primary Examiner—Steven L. Stephan
Attorney, Agent, or Firm—Max Fogiel

[57] ABSTRACT

A motor (2) forming a unit with a record turntable (5) is introduced through a recess (8) of corresponding dimensions of the frame (1) and through a narrow opening (9) in a connecting central bore (10) and fixed by means of a retaining spring (11) pushed into a slit in the centering shoulder of the motor.

7 Claims, 2 Drawing Sheets

DEVICE FOR RECORDING INFORMATION ON AND PLAYING IT BACK FROM A DRIVEN RECORDING MEDIUM

The invention concerns the device recited in the preamble to Claim 1.

Motors are secured in devices in such a way that they can carry out their function at a constant quality.

Securing a motor directly to a chassis by means of flanges and screws and then inserting the drive mechanism (turntable or similar component) is known. Problems with balance, however, sometimes occur.

The object of the invention is to make it possible to insert a motor subject to conditions that are desirable from the aspects of tolerance and balance.

This object is attained in the device recited in the preamble to Claim 1 in accordance with the characteristics recited in the body of that claim. Further developments of the invention will be evident from the subsidiary claims.

Figure 2:
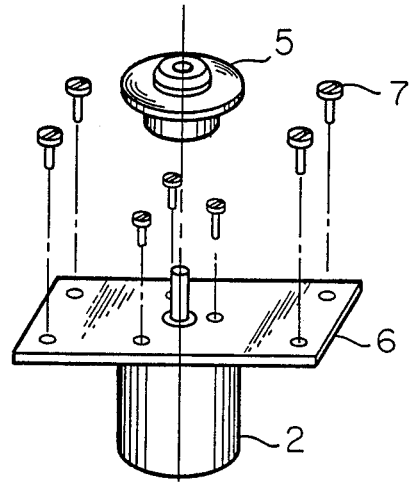
Figure 2:
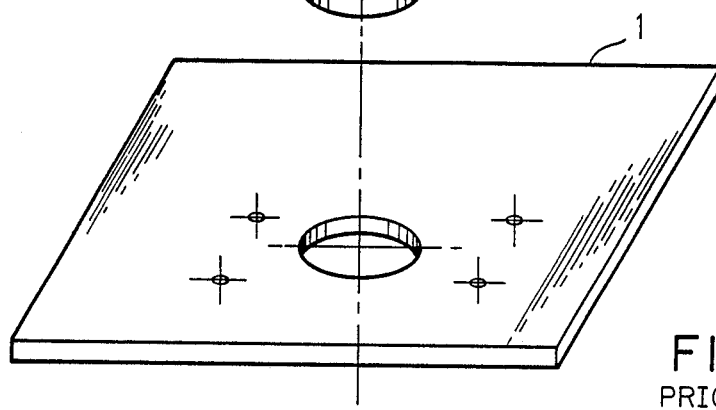
Figure 3:
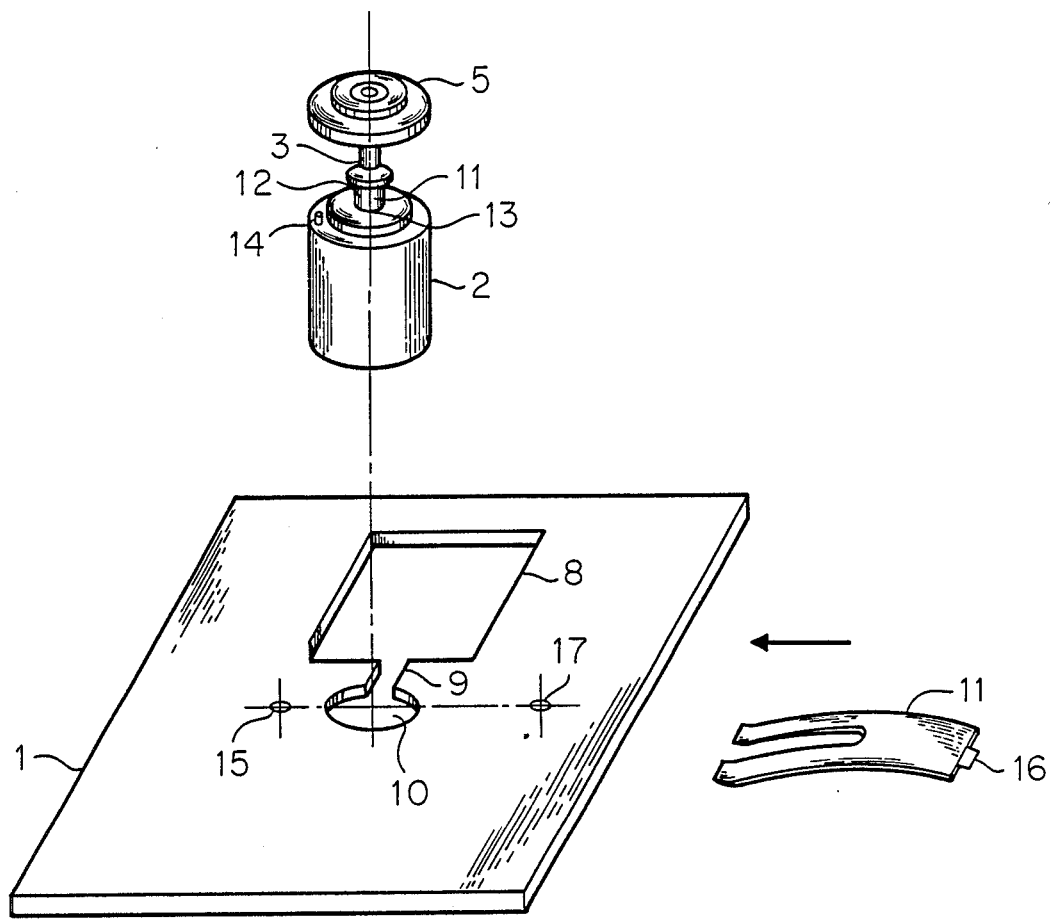

One embodiment of the invention will now be described with reference to the drawing, wherein FIGS. 1 and 2 represent the state of the art and FIG. 3 illustrates one embodiment of the invention.

FIG. 1 illustrates a chassis 1 for accommodating a motor 2. The shaft 3 of motor 2 extends through chassis 1 from the bottom. Screws 4 secure an invisible flange on motor 2 to chassis 1. A turntable 5 that accommodates phonograph records is secured over shaft 3. There are accordingly problems with balance and tolerance. Although an acceptable tolerance can be established in the embodiment illustrated in FIG. 1, the turntable cannot be secured to the shaft until the motor has been inserted. The balance ratios are accordingly very detrimental, and can only be checked and if necessary corrected at high expense.

FIG. 2 illustrates a chassis 1 wherein motor 2 is assembled into a single unit along with turntable 5 by means of a flange 6 and screws 7, such that its balance can be checked before being inserted into chassis 1. This embodiment, however, has detrimental tolerance conditions because the tolerances of the screw-on flange and those of the screw-on motor-flange unit can become superimposed.

FIG. 3 illustrates a chassis 1 prepared to accommodate a motor 2 that has already been checked and provided with a turntable 5 and requiring no screws. Once turntable 5 has been secured to motor shaft 3 by pressure and/or cement, subassembly 2 & 5 can be checked and corrected for balance. Motor-and-turntable unit 2 & 5 is positioned for mounting on chassis 1 through a recess 8 in chassis 1 and a slot 9 in a centering structure 10. A retaining spring 11 is inserted into a groove 12 on what is called a centering shoulder 13 on the subassembly at that point.

A pin 14 that extends parallel to the driveshaft can be mounted on the motor housing or on the centering shoulder and extend into a matching bore 15 in chassis 1 to prevent relative rotation. A tongue 16 on retaining spring 11 engages a bearing 17 on chassis 1 and prevents the spring from moving on its own accord. Thus, only one retaining spring 11 is needed to secure motor 2 to sheet-metal chassis 1. Centering shoulder 13 must accordingly have a constriction all the way around where it engages groove 12. Motor 2 can in conjunction with the mounted turntable 5 be inserted through the matching recess 8 in chassis 1 and through narrow slot 9 into an adjacent centering bore 10 and lifted at that point. In this position retaining spring 11 is shifted into the constriction around centering shoulder 13 until tongue 16 snaps into chassis 1. A longitudinally curved, more or less rectangular retaining spring 11 with two prongs and a tongue 16 that bends down at a right angle has been proven practical for this embodiment.

The design in accordance with the invention has many advantages. It requires no screws. It can be assembled rapidly. The motor is precisely positioned. The turntable can be forced onto and/or cemented to the shaft before the motor is mounted. The retaining spring and chassis are stampings, which can be cost-effectively manufactured. Service is facilitated by the potential for replacing the components. Positioning tolerances are low, only ¼ of those that can be attained with the embodiment illustrated in FIG. 2.

The version illustrated in FIG. 3 is especially practical for record players—CD players—that employ optical scanning. When scanning CD's in fact it is extremely important for the optical axis of the scanning system to coincide with a normal to the CD at the scanning point. Deviations between the optical axis and the normal result in incorrect angles in what is called the jitter or radial direction. The final result can be unreliable scanning or bit and burst errors.

The axial position of the disk at the scanning point depends on many factors. Tolerances in the motor, motor mount, and turntable are very important. To keep potential eccentricities as small as possible, which is absolutely necessary for unobjectionable radial tracking, the rotating parts must not on the other hand get out of balance. This necessitates input control in relation to motors with mounted turntables. High-quality components must be employed.

The motor must accordingly be secured to the chassis with due consideration to any impermissible tolerances in such a way that they will not become superimposed. It must simultaneously be ensured that the motor-and-turntable subassembly has been checked for balance and rejected or corrected before being mounted.

I claim:

1. A device for recording information on and/or playing back the information from a recording medium driven by a motor, comprising: a motor having a centering shoulder; stationary centering means corresponding to the shape of said motor and having a bore corresponding to said centering shoulder; said centering shoulder having a projection extending beyond said centering means; said projection having a groove; and a resilient element engaging said groove, said centering means resting against said resilient element; and a turntable preassembled to said motor prior to mounting in place free of screws.

2. A device as defined in claim 1, including a chassis securable to said motor; projection means engaging perforation means so that said motor and chassis cannot rotate or slide relative to each other after being secured together.

3. A device as defined in claim 1, wherein said centering means communicates with a matching recess through a slot, said motor and said centering shoulder being insertable into said centering means through said recess and said slot.

4. A device as defined in claim 1, wherein said centering shoulder is a positive shoulder.

5. A device as defined in claim 1, wherein said centering shoulder is a negative shoulder.

6. A device for recording information on and/or playing back the information from a recording medium driven by a motor, comprising: a motor having a centering shoulder; stationary centering means corresponding to the shape of said motor and having a bore corresponding to said centering shoulder; said centering shoulder having a projection extending beyond said centering means; said projection having a groove; and a resilient element engaging said groove, said centering means resting against said resilient element; and a turntable preassembled to said motor prior to mounting in place free of screws; a chassis securable to said motor; projection means engaging perforation means so that said motor and chassis cannot rotate or slide relative to each other after being secured together; said centering means communicating with a matching recess through a slot, said motor and said centering shoulder being insertable into said centering means through said recess and said slot.

7. A device for recording information on and/or playing back the information from a recording medium driven by a motor, comprising: a motor having a centering shoulder; stationary centering means corresponding to the shape of said motor and having a bore corresponding to said centering shoulder; said centering shoulder having a projection extending beyond said centering means; said projection having a groove; and a resilient element engaging said groove, said centering means resting against said resilient element; and a turntable preassembled to said motor prior to mounting in place free of screws; said motor and said turntable being correctable for balance after being secured together; a chassis with a recess and a slot in said centering means for positioning and mounting said motor and said turntable after being secured together; a retaining spring insertable into a groove on a centering shoulder; a pin mounted on said motor and extending into a corresponding bore in said chassis to prevent relative rotation; a tongue on a retaining spring engaging a bearing on chassis one and preventing said spring from moving; said motor with said turntable being insertable through said recess in said chassis and through said slot into an adjacent centering bore and said spring being shifted to a constriction around said centering shoulder until said tongue snaps into said chassis; said spring comprising a longitudinally curved and substantially rectangular spring with two prongs and a tongue bent downward at a substantially right angle.

* * * * *